United States Patent
Clayton et al.

(10) Patent No.: US 8,751,820 B2
(45) Date of Patent: *Jun. 10, 2014

(54) INTERFACES FOR COMBINING CALLS IN AN EMULATED ENVIRONMENT

(75) Inventors: Kevin F. Clayton, Coto de Caza, CA (US); Yuko Onishi, Laguna Hills, CA (US); Raymond Campbell, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/324,144

(22) Filed: Dec. 13, 2011

(65) Prior Publication Data

US 2013/0151863 A1    Jun. 13, 2013

(51) Int. Cl.
*G06F 21/00* (2013.01)
(52) U.S. Cl.
USPC ................................. 713/189; 703/23; 703/26
(58) Field of Classification Search
None
See application file for complete search history.

(56) References Cited

U.S. PATENT DOCUMENTS

| | | | | |
|---|---|---|---|---|
| 6,247,041 B1 * | 6/2001 | Krueger et al. | ............... | 718/104 |
| 6,286,052 B1 * | 9/2001 | McCloghrie et al. | ......... | 709/238 |
| 6,836,888 B1 * | 12/2004 | Basu et al. | ..................... | 718/104 |
| 7,644,369 B2 * | 1/2010 | Hoe-Richardson | ........... | 715/768 |
| 8,479,019 B1 * | 7/2013 | Clayton et al. | ................. | 713/190 |
| 2002/0144244 A1 * | 10/2002 | Krishnaiyer et al. | ......... | 717/140 |
| 2006/0248080 A1 * | 11/2006 | Gray | ................................ | 707/7 |

* cited by examiner

*Primary Examiner* — Benjamin Lanier
(74) *Attorney, Agent, or Firm* — James E. Goepel (57) ABSTRACT

Calls from an application in an emulated environment to a module in the operating system hosting the emulated environment may be combined to reduce the overhead of accessing the module. An application handling secure shell (SSH) communications may execute multiple calls to a cryptographic module in the host operating system. Because many calls to the cryptographic module during SSH communications follow patterns, two or more related calls may be combined into a single combined call to the cryptographic module. For example, a call to generate a server-to-client key and a call to generate a client-to-server key may be combined into a single call.

18 Claims, 6 Drawing Sheets

INTERFACES FOR COMBINING CALLS IN AN EMULATED ENVIRONMENT

The instant disclosure relates to emulated environments. More specifically, this disclosure relates to communications between the emulated environment and the host operating system.

BACKGROUND

Figure 1:
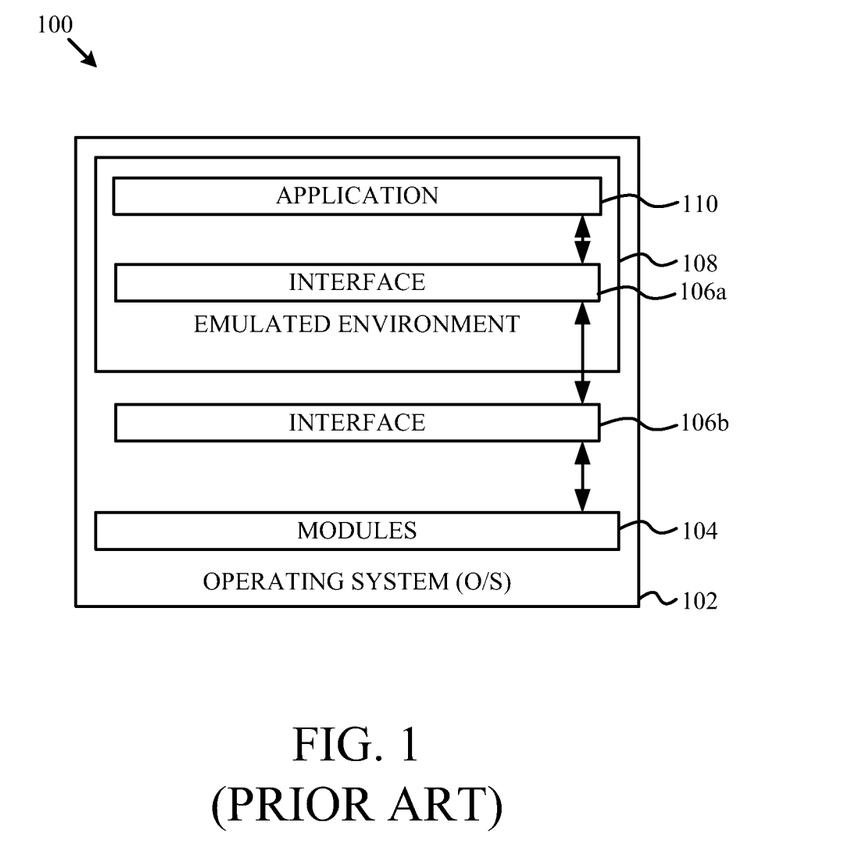
FIG. 1 is a block diagram illustrating a conventional application executing in a host operating system.

Applications executing in an emulated environment access modules in a host operating system through an interface. FIG. 1 is a block diagram illustrating a conventional application executing in a host operating system. An application 110 executes inside an emulated environment 108. To perform certain function, such as when functions are performed in hardware, the emulated environment 108 accesses modules 104 in the host operating system 102 through an interface 106, including an interface component 106a in the emulated environment 108 and an interface component 106b in the operating system 102. The interface 106 provides translation services and acts as an intermediary between the emulated environment 108 and the modules 104 of the host operating system 102. The interface 106a in the emulated environment 108 communicates with the cooperating interface 106b in the operating system 102. The cooperating interface 106b in the operating system 102 then makes the calls on the modules 104.

Calls from the application 110 to the module 104 are costly in terms of execution speed and memory overhead, because of translation of the data to/from the format needed by the operating system 102 and to actually move the data from the emulated environment 108 to the modules 104. The increased delay and overhead in accessing the modules 104 through the interface 106 with each call can degrade performance of the application 110 within the emulated environment 108. Thus, there is a need to reduce use of the interface 106 to improve performance of the application 110.

SUMMARY

According to one embodiment, a method for providing secure communications to an application in an emulated environment may include providing an interface for an application executing in an emulated environment of a host operating system, in which the application accesses a security module in the host operating system through calls to the interface. The method may also include identifying two or more related calls from the application to the module for processing data during secure shell communications. The two or more related calls may include at least one of a call to a CreateHash function, a call to a HashData function, and a call to a GetHashValue function. The method may further include combining the two or more related calls into a single call. The method may also include executing a single combined call to the module of the host operating system to perform the two or more related calls.

According to another embodiment, a computer program product for providing secure communications to an application in an emulated environment having a non-transitory computer-readable medium includes code to provide an interface for an application executing in an emulated environment of a host operating system, in which the application accesses a module in the host operating system through calls to the interface. The medium also includes code to identify two or more related calls from the application to the module for processing data during secure shell communications. The two or more related calls may include at least one of a call to a CreateHash function, a call to a HashData function, and a call to a GetHashValue function. The medium further includes code to combine the two or more related calls into a single call. The medium also includes code to execute a single combined call to the module of the host operating system to perform the two or more related calls.

According to yet another embodiment, an apparatus for providing secure communications to an application in an emulated environment includes a processor and a memory coupled to the processor. The processor is configured to provide an interface for an application executing in an emulated environment of a host operating system, in which the application accesses a module in the host operating system through calls to the interface. The processor is further configured to identify two or more related calls from the application to the module for processing data in secure shell communications. The two or more related calls may include at least one of a call to a CreateHash function, a call to a HashData function, and a call to a GetHashValue function. The processor is also configured to combine the two or more related calls into a single call. The processor is further configured to execute a single combined call to the module of the host operating system to perform the two or more related calls.

According to a further embodiment, a method for providing secure communications to an application in an emulated environment includes receiving a first call to a module located outside an emulated environment for processing data during a secure shell session. The method also includes receiving a second call to the module located outside the emulated environment for processing data during the secure shell session. The method further includes combining the first call and the second call in a combined call. The method also includes executing the combined call to the module located outside the emulated environment.

According to another embodiment, an apparatus for providing secure communications to an application in an emulated environment includes a host operating system including at least one module. The apparatus also includes an emulated environment executing in the host operating system. The apparatus further includes an interface between the emulated environment and the module. The interface translates calls from an application in the emulated environment to calls to the module in the host operating system. The interface combines a first call and a second call from the application into a single combined call to the module.

According to yet another embodiment, a computer program product for providing secure communications to an application in an emulated environment has a non-transitory computer-readable medium including code to process secure shell communications. The medium also includes code to receive a first call to a module located outside an emulated environment. The medium also includes code to receive a second call to the module located outside the emulated environment. The medium further includes code to combine the first call and the second call in a combined call. The medium also includes code to execute the combined call to the module located outside the emulated environment.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Performance of an application in an emulated environment may be improved by reducing the number of calls to modules within a host operating system that the application accesses through an interface. Reducing the number of calls to the modules reduces the amount of delay experience by the application as a result of the interface. Thus, application performance may be improved. According to one embodiment, the number of calls to the modules of a host operating system may be reduced by combining calls for related functions.

Figure 2:
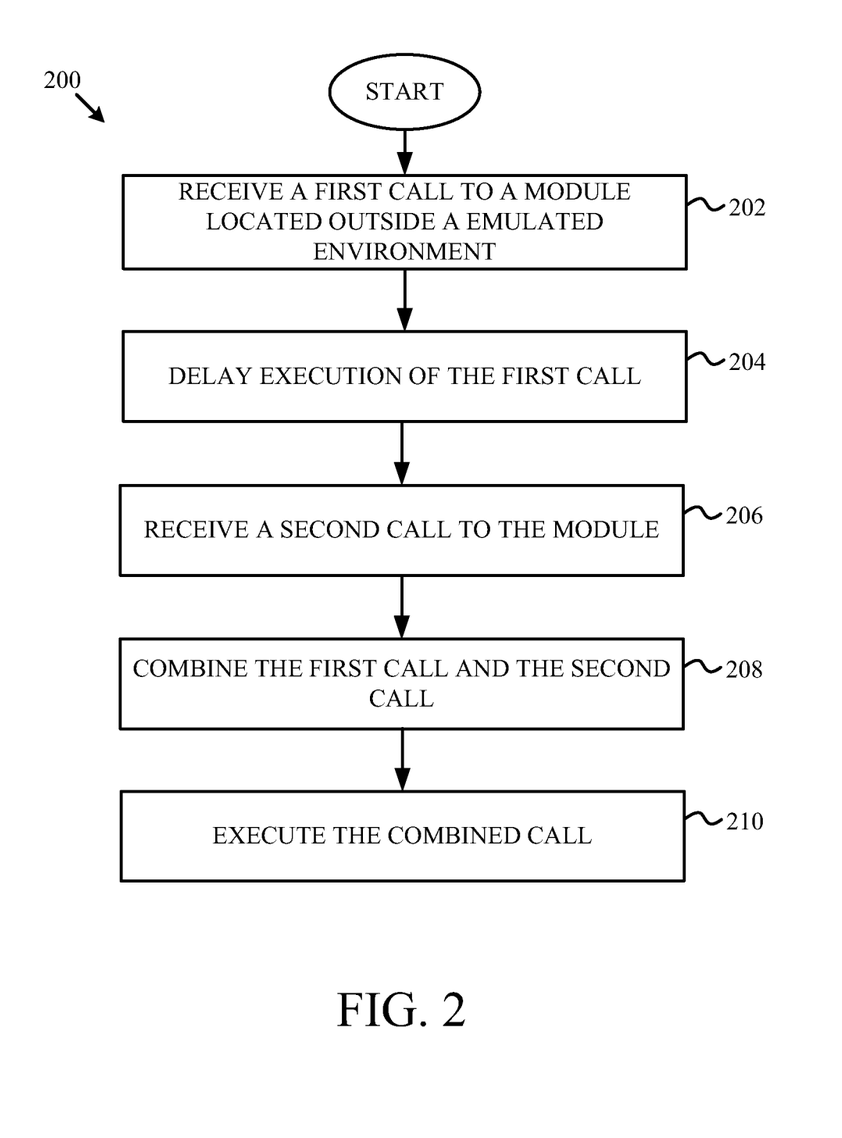
FIG. 2 is a flow chart illustrating an exemplary method for combining calls to modules through an interface according to one embodiment of the disclosure.

FIG. 2 is a flow chart illustrating an exemplary method for combining calls to modules through an interface according to one embodiment of the disclosure. A method 200 begins at block 202 with the emulated environment receiving a first call to a module located outside the emulated environment. At block 204, the emulated environment recognizes the first call as a call possibly having subsequent related calls, and the emulated environment delays execution of the first call. At block 206, a second call is received for the module located outside the emulated environment. At block 208, the first call and the second call are combined into a single combined call. At block 210, the combined call is executed. Thus, the number of calls to the module located outside the emulated environment is reduced by combining calls.

An emulated environment may have a table of calls used for determining when a first call may have a possible related second call at block 204. Alternatively, software executing in the emulated environment may have functions that issue two or more calls in a combined call. In this embodiment, there may be no delay in executing the first call while waiting for the second call to execute the combined call.

Figure 3:
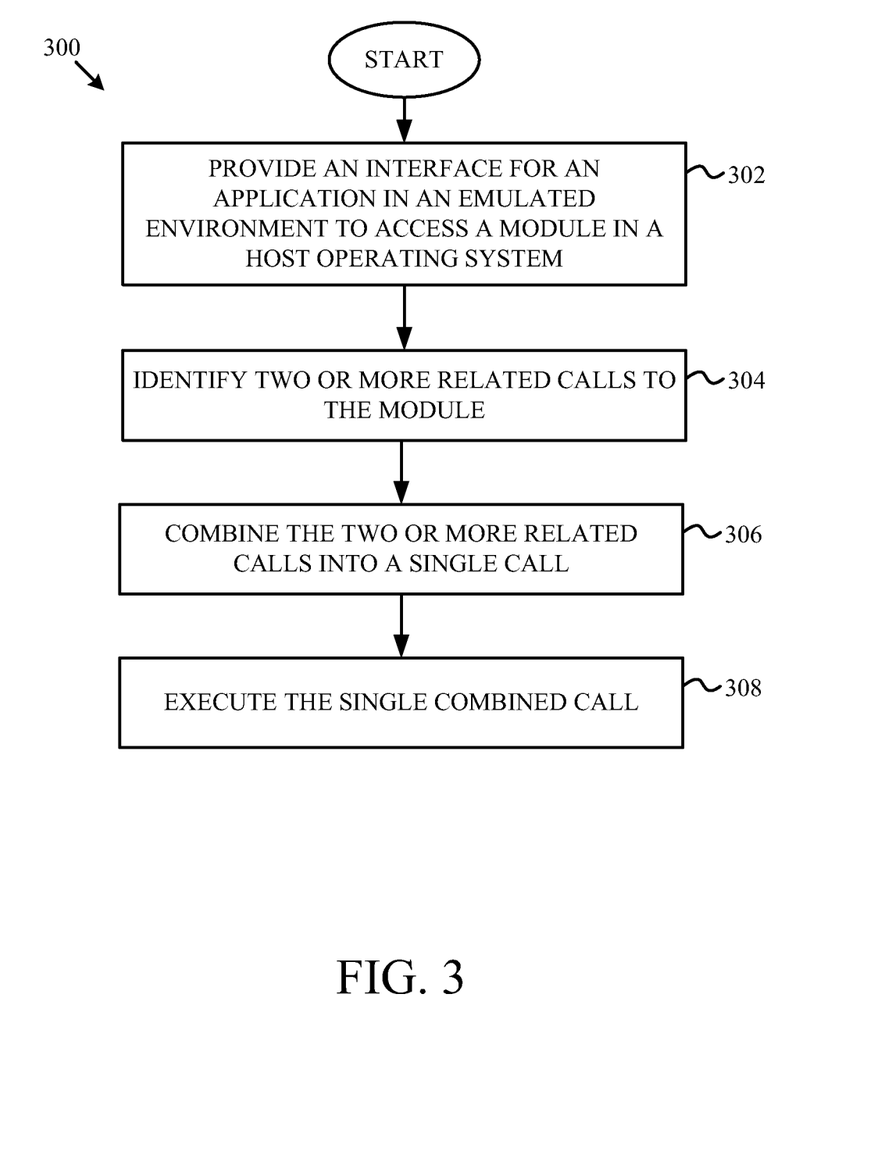
FIG. 3 is a flow chart illustrating an exemplary method for combining calls to modules through an interface according to another embodiment of the disclosure.

FIG. 3 is a flow chart illustrating an exemplary method for combining calls to modules through an interface according to another embodiment of the disclosure. A method 300 begins at block 302 with providing an interface for an application executing in an emulated environment to access a module in a host operating system. At block 304, two or more related calls to the module are identified, and the two or more related calls are combined into a single call at block 306. At block 308, the single combined call is executed by the module in the host operating system.

According to one embodiment, the module external to the emulated environment receiving the calls may be a cryptographic module. For example, when an application in the emulated environment is communicating through a secure shell (SSH) protocol, the application may make a number of calls to the cryptographic module for performing security-related tasks, such as generating keys and performing encryption. Certain calls to the cryptographic module are likely to be followed by certain other calls. The predictable order of calls to the cryptographic module may be used to combine calls to the cryptographic module. For example, calls to produce client-to-server keys are likely to be followed by calls to produce server-to-client keys. As another example, calls to generate a message authentication code (MAC) on a message are likely to be followed by a call to encrypt the message.

In one embodiment, the application executing in the emulated environment may be the Clear Path MCP and the host operating system may be Windows. When the Clear Path MCP system is processing SSH communication, the system may access a number of interfaces for processing calls to the cryptographic module of the host operating system. Each of the interfaces may combine multiple calls to the cryptographic module into a single combined call.

Figure 4:
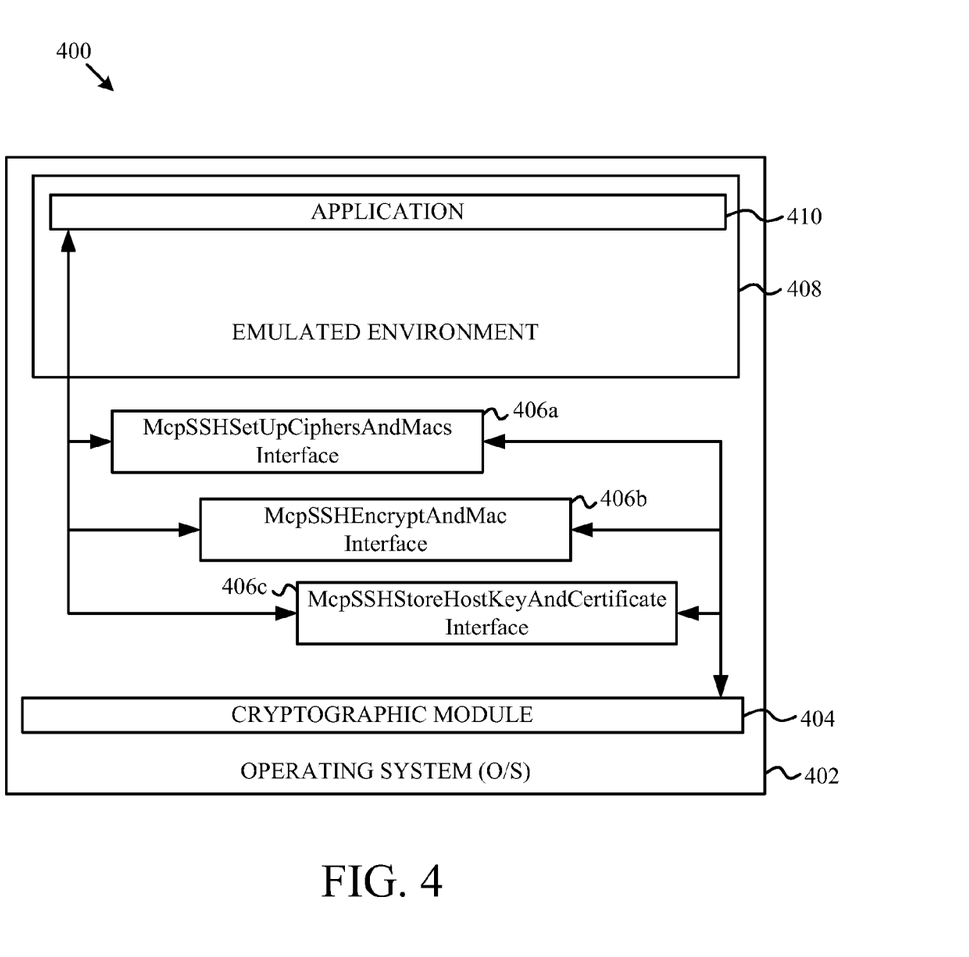
FIG. 4 is a block diagram illustrating multiple interfaces to a cryptographic module for combining calls according to one embodiment of the disclosure.

FIG. 4 is a block diagram illustrating multiple interfaces to a cryptographic module for combining calls according to one embodiment of the disclosure. An apparatus 400 includes a host operating system 402. An application 410 executes within an emulated environment 408 within the host operating system 402. A number of interfaces 406a-c are available to process calls between the application 410 and a cryptographic module 404. For example, each of the interfaces 406a-c may execute two or more related calls to the cryptographic module 404 while incurring the expense of only one call by combining the two or more related calls.

The interface 406a may be a McpSSHSetUpCiphersAndMacsInterface for combining calls related to setting up an SSH session. For example, the interface 406a may combine calls to CreateHash, HashData, GetHashValue, and CreateCipher functions. According to one embodiment, six calls may be combined to a single call. The six calls may include: a call on CreateHash, HashData, and GetHashValue to produce the initial client-to-server initialization vector (IV); a call on CreateHash, HashData, and GetHashValue to produce the initial server-to-client IV; a call on CreateHash, HashData, and GetHashValue to produce the client-to-server encryption key; a call on CreateHash, HashData, and GetHashValue to produce the server-to-client encryption key; a call on CreateHash, HashData, and GetHashValue to produce the client-to-server MAC key; and a call on CreateHash, Hashdata, and GetHashValue to produce the server-to-client MAC key.

The interface 406a may also combine calls to a CreateCipher function. For example, two calls may be combined into a single call including: a call to CreateCipher to create the client-to-server cipher using the client-to-server encryption key; and a call to CreateCipher to create the server-to-client cipher using the server-to-client encryption key.

In another example, the interface 406a may combine calls to a CreateHash function. For example, two calls may be combined into a single call including: a call to CreateHash to create a client-to-server MAC using the client-to-server MAC key; and a call to CreateHash to create a server-to-client MAC using the server-to-client MAC key.

The interface 406b may be a McpSSHEncryptAndMac interface for combining calls related to communications over the SSH protocol. For example, calls to an EncryptData function, a HashData function, and a GetHashValue function may be combined into a single call through the interface 406b.

The interface 406c may be a McpSSHStoreHostKeyAndCertificate interface for combining calls related to managing a communications session for the SSH protocol. For example, calls to an ImportPublicKey function, an OpenCertificateStore function, and a StoreCertificate function may be combined into a single call through the interface 406c.

Although not shown in FIG. 4, additional interfaces 406 may be provided between the application 410 and the cryptographic module 404 to execute other combinations of calls. For example, other interfaces may include: a McpCryptGenDHPublicValue interface for generating a Diffie-Hellman key; a McpCryptGenDHSharedSecret interface for generating shared secrets; a McpSSHHashAndSign interface for calculating a hash and a signature for a message; a McpSSHHashAndVerifySignature interface for generating an exchange hash and verifying the server's signature of the hash; and a McpSSHDecryptAndVerifyMac interface for decrypting and verifying a MAC.

Figure 5:
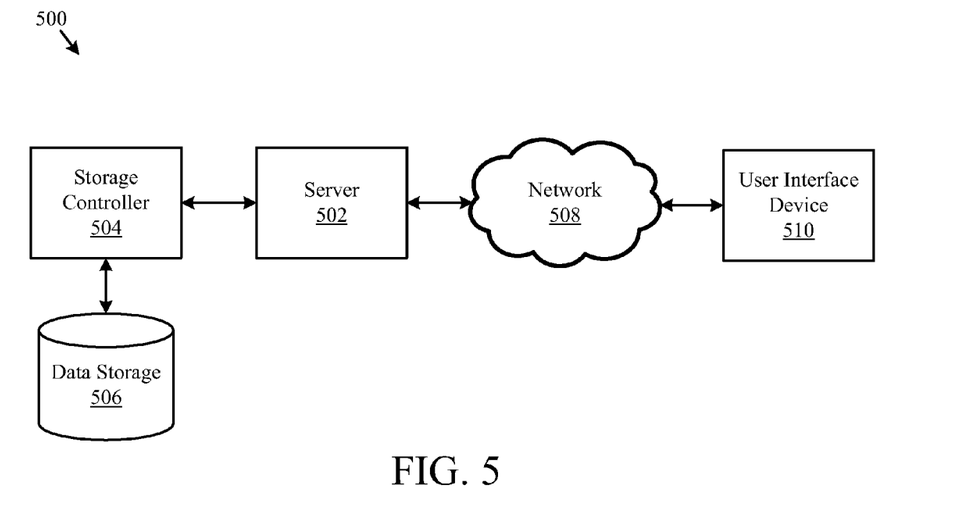
FIG. 5 is block diagram illustrating a computer network according to one embodiment of the disclosure.

FIG. 5 illustrates one embodiment of a system 500 for an information system, such as a system for executing programs in an emulated environment. The system 500 may include a server 502, a data storage device 506, a network 508, and a user interface device 510. The server 502 may be a dedicated server or one server in a cloud computing system. In a further embodiment, the system 500 may include a storage controller 504, or storage server configured to manage data communications between the data storage device 506 and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or tablet computer, a smartphone or other a mobile communication device having access to the network 508. When the device 510 is a mobile device, sensors (not shown), such as a camera or accelerometer, may be embedded in the device 510. When the device 510 is a desktop computer the sensors may be embedded in an attachment (not shown) to the device 510. In a further embodiment, the user interface device 510 may access the Internet or other wide area or local area network to access a web application or web service hosted by the server 502 and provide a user interface for enabling a user to enter or receive information.

The network 508 may facilitate communications of data, such as authentication information, between the server 502 and the user interface device 510. The network 508 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the user interface device 510 accesses the server 502 through an intermediate sever (not shown). For example, in a cloud application the user interface device 510 may access an application server. The application server fulfills requests from the user interface device 510 by accessing a database management system (DBMS), which stores authentication information and associated action challenges. In this embodiment, the user interface device 510 may be a computer or phone executing a Java application making requests to a JBOSS server executing on a Linux server, which fulfills the requests by accessing a relational database management system (RDMS) on a mainframe server.

Figure 6:
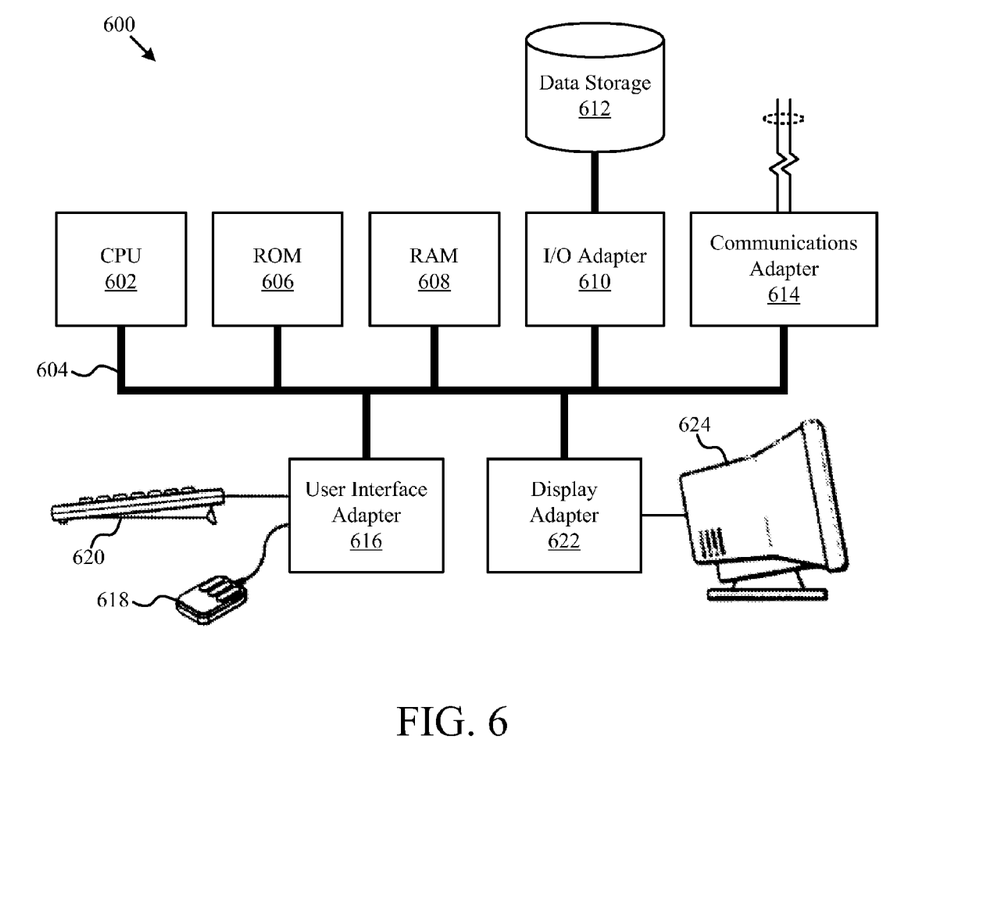
FIG. 6 is a block diagram illustrating a computer system according to one embodiment of the disclosure.

FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the modules and operations as described herein. The CPU 602 may execute the various logical instructions according to the present embodiments.

The computer system 600 also may include random access memory (RAM) 608, which may be synchronous RAM (SRAM), dynamic RAM (DRAM), and/or synchronous dynamic RAM (SDRAM). The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a flash drive, a compact disc (CD) drive, a floppy disk drive, and a tape drive, to the computer system 600. The communications adapter 614 may be adapted to couple the computer system 600 to the network 508, which may be one or more of a LAN, WAN, and/or the Internet. The communications adapter 614 may also be adapted to couple the computer system 600 to other networks such as a global positioning system (GPS) or a Bluetooth network. The user interface adapter 616 couples user input devices, such as a keyboard 620, a pointing device 618, and/or a touch screen (not shown) to the computer system 600. The keyboard 620 may be an on-screen keyboard displayed on a touch panel. Additional devices (not shown) such as a camera, microphone, video camera, accelerometer, compass, and or a gyroscope may be coupled to the user interface adapter 616. The display adapter 622 may be driven by the CPU 602 to control the display on the display device 624.

The applications of the present disclosure are not limited to the architecture of computer system 600. Rather the computer system 600 is provided as an example of one type of computing device that may be adapted to perform the functions of a server 502 and/or the user interface device 510. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for providing secure communications to an application in an emulated environment, comprising:
    receiving a first call comprising a request for producing a server-to-client encryption key, the first call being received from the application to a security module located outside the emulated environment, for processing data during a secure shell session;
    receiving a second call comprising a request for producing a client-to-server encryption key, the second call being received from the application to the security module located outside the emulated environment, for processing data during the secure shell session;
    combining the first call and the second call in a combined call; and
    executing the combined call to the security module located outside the emulated environment.

2. The method of claim 1, in which the emulated environment is executing in a host operating system and the module is located in the host operating system.

3. The method of claim 2, in which the security module is a cryptographic module.

4. The method of claim 1, further comprising delaying execution of the first call before receiving the second call.

5. The method of claim 4, further comprising identifying the first call in a look-up table before delaying execution of the first call.

6. An apparatus, comprising:
    a host operating system executing on at least one CPU of the apparatus, the host operating system including at least one security module;
    an emulated environment executing in the host operating system;
    an application executing in the emulated environment for performing secure shell communications; and
    an interface between the emulated environment and the security module, in which the interface translates calls from the application in the emulated environment to calls to the security module in the host operating system, and in which the interface combines a first call to generate an encryption key and a second call to generate an encryption key from the application into a single combined call to the security module during the secure shell communications.

7. The apparatus of claim 6, in which the security module comprises a cryptographic module.

8. The apparatus of claim 7, in which the cryptographic module comprises a certificate store.

9. The apparatus of claim 6, in which the emulated environment is a proprietary environment incompatible with the host operating system.

10. The apparatus of claim 6, further comprising a second interface, in which the second interface combines more than one calls from the application into a single combined call to the security module, and in which the second interface combines a third call and a fourth call, distinct from the first call and the second call, into a single combined call to the security module.

11. The apparatus of claim 6, in which the interface is configured:
    to receive a first call from the application in the emulated environment;
    to delay execution of the first call;
    to receive a second call from the application in the emulated environment;
    to combine the first call and the second call into a single combined call; and
    to execute the single combined call to the module.

12. The apparatus of claim 11, in which the interface is further configured to identify the first call in a look-up table before delaying execution of the first call.

13. A computer program product for providing secure communications to an application in an emulated environment, comprising:
    a non-transitory computer-readable medium comprising:
        code to process secure shell communications;
        code to receive a first call to a security module located outside an emulated environment during the secure shell communications, the first call comprising a request to generate an encryption key;

code to receive a second call to the security module located outside the emulated environment during the secure shell communications, the second call comprising a request to generate an encryption key;

code to combine the first call and the second call in a combined call; and code to execute the combined call to the security module located outside the emulated environment.

14. The computer program product of claim 13, in which the emulated environment is executing in a host operating system and the module is located in the host operating system.

15. The computer program product of claim 14, in which the security module is a cryptograhic module.

16. The computer program product of claim 15, in which the security module is a cryptographic module.

17. The computer program product of claim 13, in which the medium further comprises code to delay execute of the first call before receiving the second call.

18. The computer program product of claim 13, in which the medium further comprises code to search a table to identify a related call to the first call before receiving the second call.

* * * * *